US012645722B2

(12) United States Patent
Brostoff

(10) Patent No.: US 12,645,722 B2
(45) Date of Patent: Jun. 2, 2026

(54) METHOD AND SYSTEM FOR AI-BASED WEDDING PLANNING PLATFORM

(71) Applicant: WedWiz.ai, Corona, CA (US)

(72) Inventor: Mark Brostoff, Corona, CA (US)

(73) Assignee: WedWiz.ai, Corona, CA (US)

( * ) Notice: Subject to any disclaimer, the term of this patent is extended or adjusted under 35 U.S.C. 154(b) by 0 days.

(21) Appl. No.: 18/888,431

(22) Filed: Sep. 18, 2024

(65) Prior Publication Data

US 2025/0094468 A1      Mar. 20, 2025

Related U.S. Application Data

(60) Provisional application No. 63/538,879, filed on Sep. 18, 2023.

(51) Int. Cl.
| | |
|---|---|
| *G06F 16/33* | (2025.01) |
| *G06F 16/334* | (2025.01) |
| *G06Q 50/10* | (2012.01) |
| *H04L 51/02* | (2022.01) |

(52) U.S. Cl.
CPC ......... *G06F 16/3347* (2019.01); *G06Q 50/10* (2013.01); *H04L 51/02* (2013.01)

(58) Field of Classification Search
None
See application file for complete search history.

(56) References Cited

U.S. PATENT DOCUMENTS

| | | | | |
|---|---|---|---|---|
| 9,208,472 | B2 * | 12/2015 | Mital ...................... | G06N 5/022 |
| 10,467,680 | B2 * | 11/2019 | Macaisa ................. | G06Q 50/01 |

| | | | | |
|---|---|---|---|---|
| 11,074,555 | B2 * | 7/2021 | Shah ................... | G06Q 10/1097 |
| 11,436,541 | B2 * | 9/2022 | Schlesinger ......... | G06Q 10/025 |
| 11,727,357 | B2 * | 8/2023 | Parikh .................... | G06Q 30/04 |
| | | | | 705/301 |
| 11,763,222 | B2 * | 9/2023 | Thakker ............. | G06Q 30/0201 |
| | | | | 705/5 |

(Continued)

FOREIGN PATENT DOCUMENTS

WO      WO-2024201534 A1 *   10/2024   ............. G06Q 10/02

*Primary Examiner* — Debbie M Le

(74) *Attorney, Agent, or Firm* — The Rapacke Law Group, P.A.

(57)      ABSTRACT

A system for an automated wedding planning processing including a processor of a wedding planning server node configured to host a machine learning (ML) module and connected to at least one user-entity node and to at least one wedding organizer-entity node over a network and a memory on which are stored machine-readable instructions that when executed by the processor, cause the processor to: acquire a wedding planning request including requesting couple profile data; parse the wedding planning request to extract a plurality of key classifying features; query a local wedding planning database to retrieve local historical weddings'-related data based on the plurality of the key classifying features; generate at least one feature vector based on the plurality of key classifying features and the local historical weddings'-related data; provide the at least one feature vector to the ML module configured to generate a wedding planning predictive model for producing at least one wedding planning parameter; and generate at least one wedding planning recommendation based on the at least one wedding planning parameter.

20 Claims, 7 Drawing Sheets

(56) References Cited

U.S. PATENT DOCUMENTS

| | | | |
|---|---|---|---|
| 11,783,402 B2 * | 10/2023 | Macaisa | G06Q 50/01 |
| | | | 705/26.8 |
| 12,153,956 B2 * | 11/2024 | Sim | G06F 9/542 |
| 12,169,861 B2 * | 12/2024 | Macaisa | G06Q 30/0633 |
| 12,367,531 B1 * | 7/2025 | Ferrara | G06K 7/1417 |
| 2022/0366338 A1 * | 11/2022 | Bradley | G06Q 10/06316 |
| 2023/0419283 A1 * | 12/2023 | Le | G06Q 30/04 |
| 2024/0414108 A1 * | 12/2024 | Sun | H04L 51/216 |
| 2025/0191081 A1 * | 6/2025 | Ferrara | G06F 16/9554 |

* cited by examiner

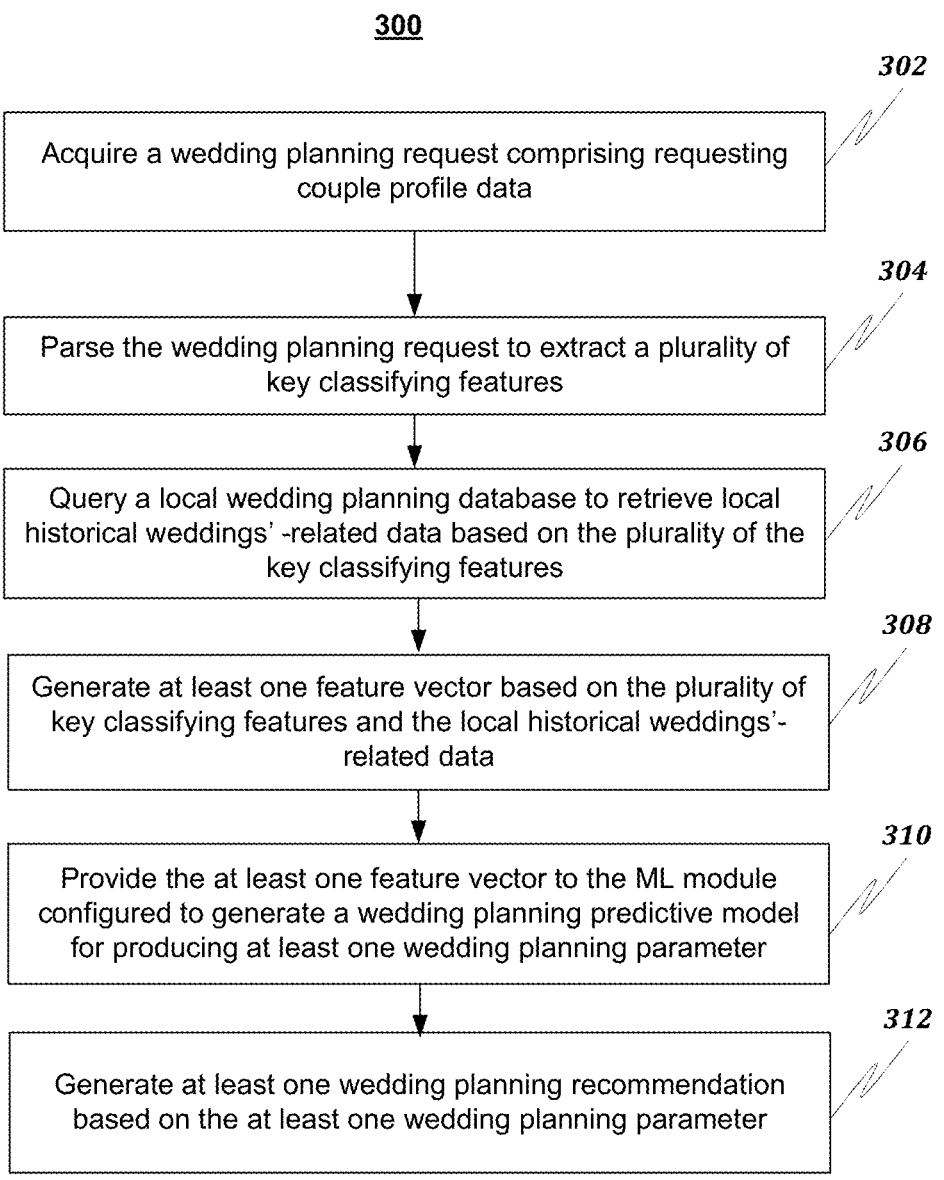

300

302

Acquire a wedding planning request comprising requesting couple profile data

304

Parse the wedding planning request to extract a plurality of key classifying features

306

Query a local wedding planning database to retrieve local historical weddings' -related data based on the plurality of the key classifying features

308

Generate at least one feature vector based on the plurality of key classifying features and the local historical weddings'-related data

310

Provide the at least one feature vector to the ML module configured to generate a wedding planning predictive model for producing at least one wedding planning parameter

312

Generate at least one wedding planning recommendation based on the at least one wedding planning parameter

FIG. 3A

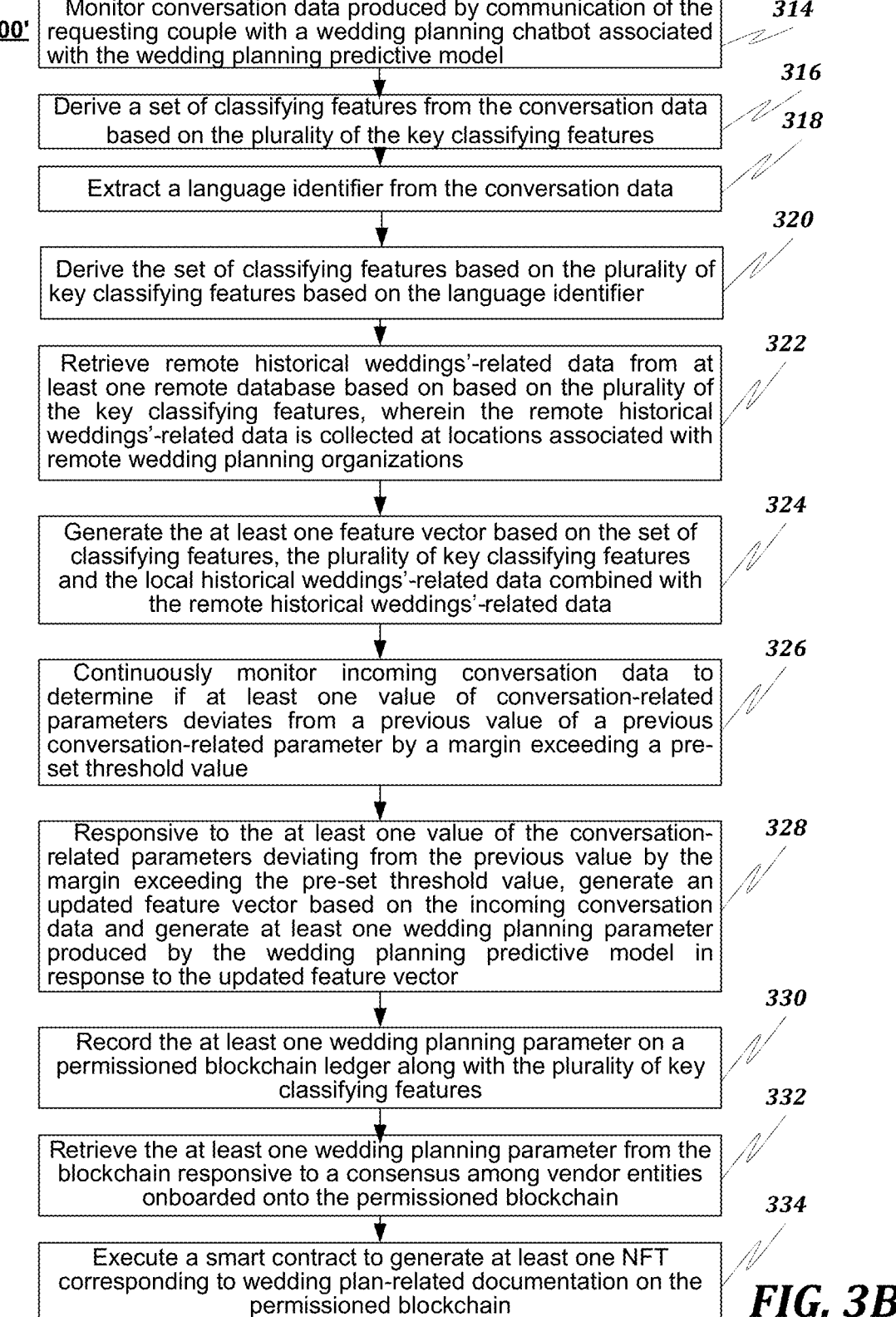

300'

314 Monitor conversation data produced by communication of the requesting couple with a wedding planning chatbot associated with the wedding planning predictive model

316 Derive a set of classifying features from the conversation data based on the plurality of the key classifying features

318 Extract a language identifier from the conversation data

320 Derive the set of classifying features based on the plurality of key classifying features based on the language identifier

322 Retrieve remote historical weddings'-related data from at least one remote database based on based on the plurality of the key classifying features, wherein the remote historical weddings'-related data is collected at locations associated with remote wedding planning organizations

324 Generate the at least one feature vector based on the set of classifying features, the plurality of key classifying features and the local historical weddings'-related data combined with the remote historical weddings'-related data

326 Continuously monitor incoming conversation data to determine if at least one value of conversation-related parameters deviates from a previous value of a previous conversation-related parameter by a margin exceeding a pre-set threshold value

328 Responsive to the at least one value of the conversation-related parameters deviating from the previous value by the margin exceeding the pre-set threshold value, generate an updated feature vector based on the incoming conversation data and generate at least one wedding planning parameter produced by the wedding planning predictive model in response to the updated feature vector

330 Record the at least one wedding planning parameter on a permissioned blockchain ledger along with the plurality of key classifying features

332 Retrieve the at least one wedding planning parameter from the blockchain responsive to a consensus among vendor entities onboarded onto the permissioned blockchain

334 Execute a smart contract to generate at least one NFT corresponding to wedding plan-related documentation on the permissioned blockchain

*FIG. 3B*

400
402
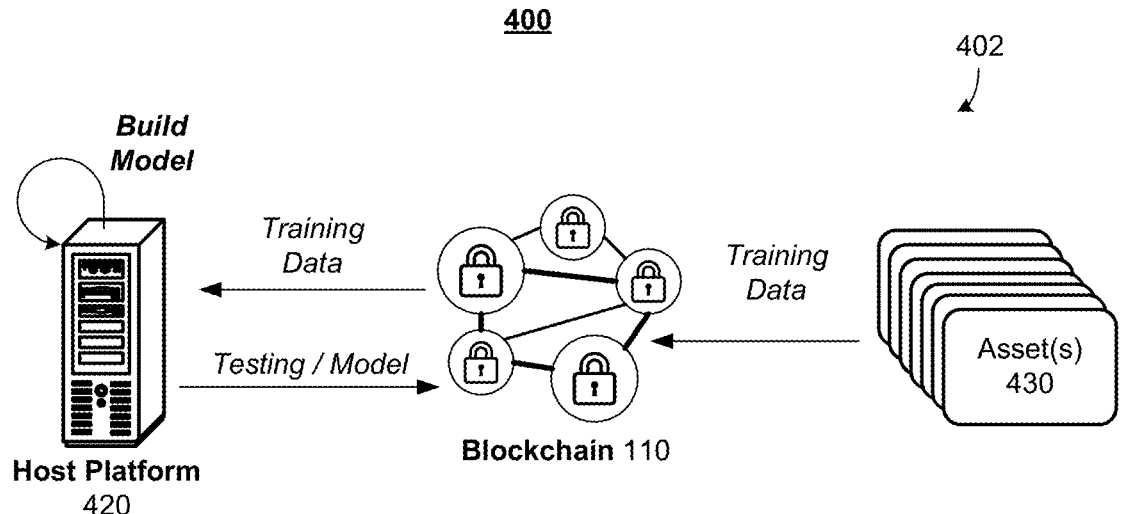
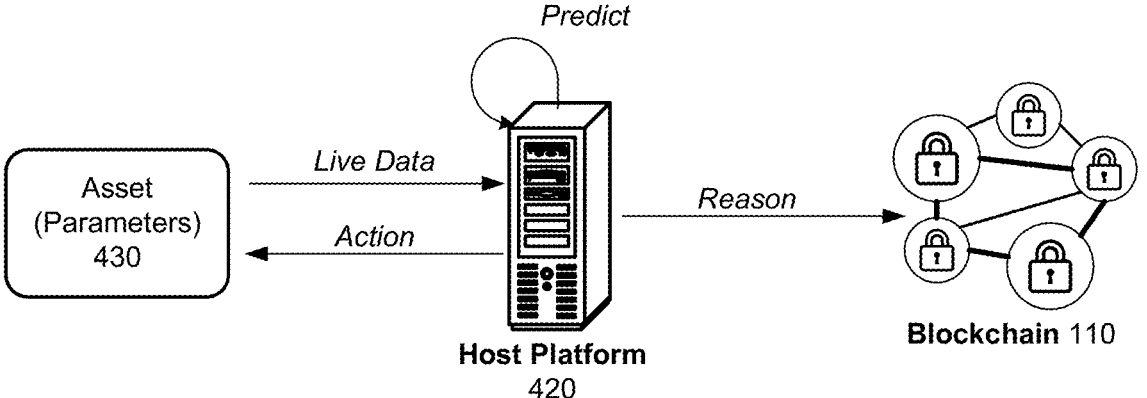
*FIG. 4*

METHOD AND SYSTEM FOR AI-BASED WEDDING PLANNING PLATFORM

CROSS-REFERENCE TO RELATED APPLICATIONS

This application claims priority to the Provisional Patent Application 63/538,879 filed on Sep. 18, 2023 incorporated herein by reference.

FIELD OF DISCLOSURE

The present disclosure generally relates to weddings preparations and setting, and more particularly, to an AI-based automated system and method for AI-based wedding platform based on predictive analytics of a couple-related data.

BACKGROUND

Planning a wedding involves extensive research, communication and coordination between various parties, planning, and transactions which can be very time consuming, expensive, and stressful. The process may involve venue inspections, price negotiations, and other time-consuming procedures.

Some existing solutions may involve a basic automation that allows for some aspects of management of wedding planning. For example, U.S. Pat. No. 11,783,402B2 discloses a social gift registry that provides tools to aid those planning for major milestones in life to engage a network of friends, family, and others in communicating information about the life event, helping to identify and track gifts for the celebrants, and enabling the management of the activities involved in the celebration.

As another example, U.S. Pat. No. 11,887,057 B2 discloses that if the user is planning a wedding, the user may have the ability to select from a series of wedding planning project templates that include information needed to start planning a wedding, such as, but not limited to: predefined milestones to guide the user through the various stages of preparations.

As yet another example, U.S. Pat. No. 11,727,357B2 discloses that wedding planning involves active monitoring of a multitude of interdependent tasks (e.g., designing, picking up, assembling, and putting away items, communicating with the client and vendors, etc.) by a multitude of individuals (e.g., team members, clients, vendors, etc.).

However, these solutions lack the important features of accurate comprehensive evaluation of the wedding request using, for example, audio, video and imaging data to generate accurate predictive wedding planning parameters that may be processed to generate wedding planning recommendations. Additionally, these applications do not mention the use of fine-tuned models based on pre-trained language models used to processing comprehensive multi-formatted wedding-related data, which can offer a significant improvement in accuracy of wedding planning with high efficiency compared to traditional wedding planning techniques and methods.

None of the current do-it-yourself wedding planning websites offer a sufficient level of detail for a user or customer with the appropriate level of integration with AI. The previously existing options only allow an extremely limited level of planning, research, tracking and to-do list options and do not have full Artificial Intelligence options.

Accordingly, a system and method for implementation of AI-based wedding platform based on predictive analytics of a couple-related data are desired.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

One embodiment of the present disclosure provides a system for an automated wedding planning processing including a processor of a wedding planning server node configured to host a machine learning (ML) module and connected to at least one user-entity node and to at least one wedding organizer-entity node over a network and a memory on which are stored machine-readable instructions that when executed by the processor, cause the processor to: acquire a wedding planning request including requesting couple profile data; parse the wedding planning request to extract a plurality of key classifying features; query a local wedding planning database to retrieve local historical weddings'-related data based on the plurality of the key classifying features; generate at least one feature vector based on the plurality of key classifying features and the local historical weddings'-related data; provide the at least one feature vector to the ML module configured to generate a wedding planning predictive model for producing at least one wedding planning parameter; and generate at least one wedding planning recommendation based on the at least one wedding planning parameter.

Another embodiment of the present disclosure provides a method that includes one or more of: acquiring a wedding planning request including requesting couple profile data; parsing the wedding planning request to extract a plurality of key classifying features; querying a local wedding planning database to retrieve local historical weddings'-related data based on the plurality of the key classifying features; generating at least one feature vector based on the plurality of key classifying features and the local historical weddings'-related data; providing the at least one feature vector to the ML module configured to generate a wedding planning predictive model for producing at least one wedding planning parameter; and generating at least one wedding planning recommendation based on the at least one wedding planning parameter.

Another embodiment of the present disclosure provides a computer-readable medium including instructions for acquiring a wedding planning request including requesting couple profile data; parsing the wedding planning request to extract a plurality of key classifying features; querying a local wedding planning database to retrieve local historical weddings'-related data based on the plurality of the key classifying features; generating at least one feature vector based on the plurality of key classifying features and the local historical weddings'-related data; providing the at least one feature vector to the ML module configured to generate a wedding planning predictive model for producing at least one wedding planning parameter; and generating at least one wedding planning recommendation based on the at least one wedding planning parameter.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings may contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 3A illustrates a flowchart of a method for an AI-based automated real-time wedding planning based on predictive analytics of a couple-related data consistent with the present disclosure;

FIG. 3B illustrates a further flowchart of a method for an AI-based automated real-time wedding planning based on predictive analytics of a couple-related data consistent with the present disclosure;

FIG. 4 illustrates deployment of a machine learning model for prediction of wedding planning parameter using blockchain assets consistent with the present disclosure;

DETAILED DESCRIPTION

Figure 1A:
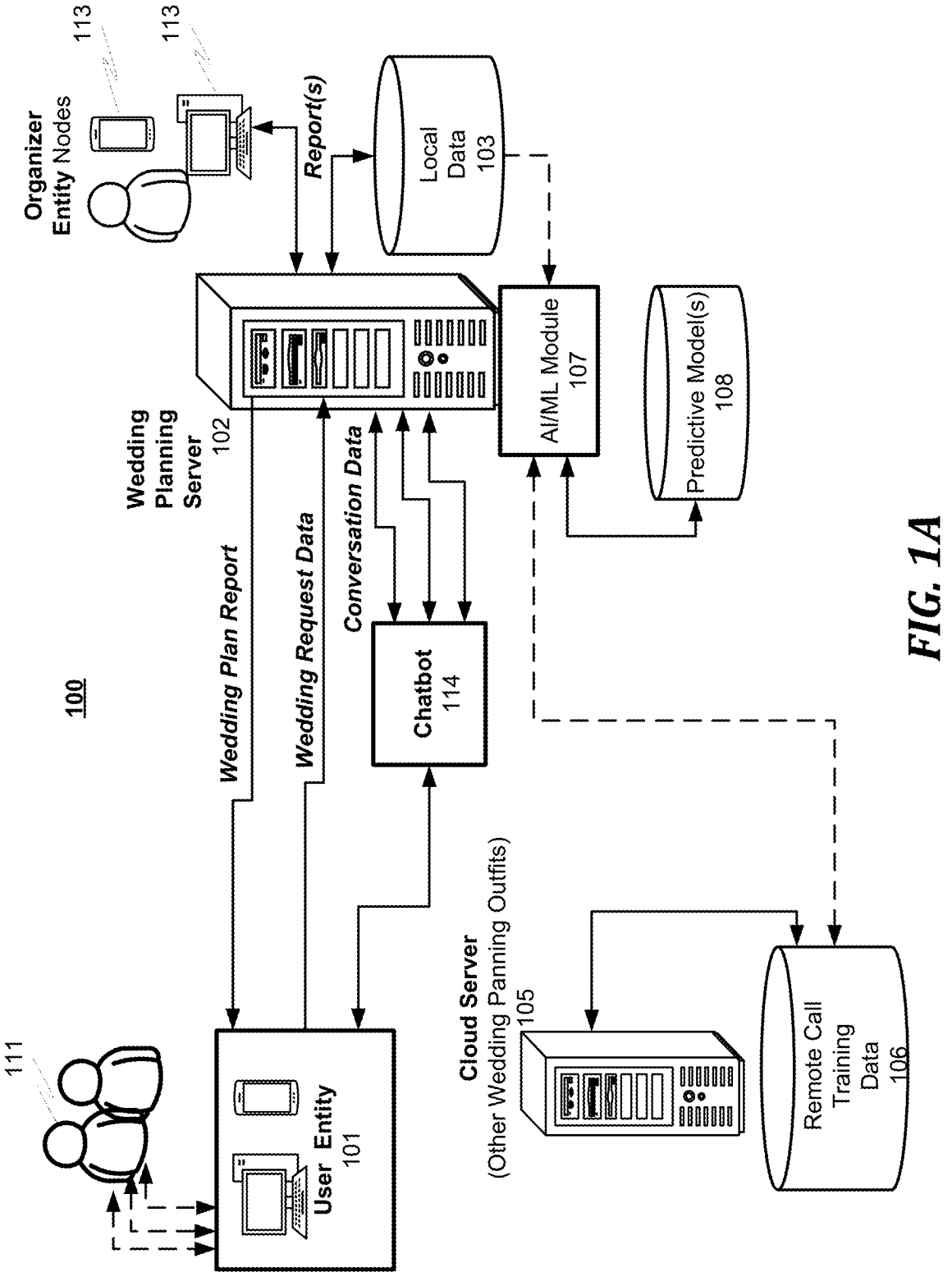
FIG. 1A illustrates a network diagram of a system for an AI-based automated real-time wedding platform based on predictive analytics of a couple-related data consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such a term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

The present disclosure includes many aspects and features. Moreover, while many aspects and features relate to, and are described in the context of generation of the predictive wedding parameters, embodiments of the present disclosure are not limited to use only in this context.

The present disclosure provides a system, method and computer-readable medium for an AI-based automated platform for real-time predictive analytics of wedding couple-related data in order to produce wedding planning parameters. In one embodiment, the system overcomes the limitations of existing methods of wedding planning by employing fine-tuned models derived from pre-trained language models to extract and process the users wedding planning request and conversation information, irrespective of data format, style, or data type. By leveraging the capabilities of the pre-trained language models and predictive models, the disclosed approach offers a significant improvement over existing solutions discussed above in the background section.

In one embodiment of the present disclosure, the system provides for an AI and machine learning (ML)-generated wedding planning parameters for a summarizer module configured to generate a wedding planning report. In one embodiment, an automated conversation model may be generated to provide for wedding recommendation parameters associated with the wedding couple.

In some embodiments, the system and method may provide complete tracking of each aspect of the wedding or other event. Further, the AI engine may utilize customer reviews of locations, vendors, and other information to form suggestions which are transmitted to the user. In some embodiments, the application includes various user interfaces including a home page in which there will be a welcome, introduction, how-to interface, FAQ, pricing information and links for privacy policy, terms and conditions, and more. When logged in there may be left side panels for menus/tabs and filling out of all customer ideas, preferences, dates, budgets, etc. in an organized ordered manner. On one side will be the AI chat area which utilizes the AI engine to implement full awareness of all previous entered customer information (except for payment details). Further a live internet search capability is provided to aid with finding ideas, vendors, read and scan previous and recent reviews, get ideas from the internet, and more.

The discloses system may allow users to input wedding details and information including, but not limited to: flower information, florist information, catering information, beverage information, photographer information, videographer information, ceremony information, music information, reception information, vendor requirements and capabilities, food information, facility information, seating information, guest information, wedding party information, etc.

The predictive model may use historical weddings'-related data collected at the current wedding planning virtual entity and at other wedding planning offices of the same type located within a certain range from the current location or even located globally. The relevant target weddings' data may include data related to other weddings having the same parameters such as type of location, size, conditions, budgets and prices' data, language of the jurisdiction, nationality of the wedding couple, etc. In one embodiment, the relevant weddings' data may indicate successfully planned and organized weddings based on analytics, conditions, times of the year, etc. This way, the best matching wedding organizer may be directed to respond to a real-life user request based on current user entity-related data and historical data of users/couples associated with the weddings having the same characteristics.

In one embodiment, to enhance this process, the system may integrate advanced technologies discussed above, such as Artificial Intelligence (AI) and machine-learning (ML) and Blockchain. The AI may be leveraged for several key functions discussed below. In one embodiment, the AI-based wedding planning system may be used to predict the wedding planning parameters. The system may employ a summarizer module for generation of a wedding planning report including various panning metrics.

The predictive models of the disclosed embodiments provide for more accurate planning of the wedding. The predictive outputs may include detailed wedding plan and cost estimations.

In one embodiment, a summarizer module may be implemented to generate detailed wedding estimates based on the predictive wedding planning parameters. In one embodiment, users will be able to ask a LLM chatbot about the wedding planning details. The chatbot may be coupled to the AI module which is trained on data from the wedding planning reports as well as other data to provide a deeper understanding and further training of the models indicating which data points are key to include when summarizing the wedding plan.

Additionally, the disclosed comprehensive wedding planning system may incorporate blockchain technology to ensure the transparency and immutability of transactions, providing a secure and trustworthy platform. By embedding these advanced technologies, the disclosed automated wedding planning system, advantageously, offers a sophisticated and secure solution.

As discussed above, in one disclosed embodiment, the AI/ML technology may be combined with a blockchain technology for secure use of the user entity-related data and the target wedding venue data. The wedding planning report reviewers (e.g., the organizers) can accept or edit the machine generated wedding planning report, and send back to the requesting user. In one embodiment, a blockchain consensus may need to be implemented prior to provision of the final wedding planning report to the requesting users. In one embodiment, the wedding planning report and related documents may be stored in a form of uniquely minted NFTs on the blockchain ledger.

FIG. 1A illustrates a network diagram of a system for an AI-based automated real-time wedding platform based on predictive analytics of a couple-related data consistent with the present disclosure.

Referring to FIG. 1A, the example network 100 includes the Wedding Planning Server (WPS) node 102 connected to a cloud server node(s) 105 over a network. The WPS node 102 is configured to host an AI/ML module 107. The WPS node 102 may receive a wedding planning request from a couple 111 including requesting couple profile data from the user-entity node 101 associated with the couple 111. The WPS node 102 may receive transcribed call or audio data related to the conversation between the user entity 101 associated with the couple 111 and the responding wedding organizer agent that may be implemented as chatbot 114 supported by the AI/ML module 107 of the WPS node 102. The user request data may include documents (digital or OCRed), video and audio files.

The wedding planning request may have language indicator metadata representing the language of the requesting couple 111. The conversation data may refer to any communications via a chatbot 114 application. In one embodiment, the conversation data may be processed by the WPS node 102 using the pre-trained large language models. The WPS node 102 may derive the language indicator metadata and parse out the wedding planning request and/or the conversation data based on the language indicator metadata. In other words, the key features of the conversation data may be, advantageously, derived from the conversation data based on the language of the communication, such as a call or email, text or other communication.

In one embodiment, the language indicator may serve as a kind of a linguistic profile associated with the wedding planning request. The language indicator may guide the AI/ML module 107 in dynamically tailoring the conversation recommendation parameters for the chatbot 114 processing. Depending on the language indicated, the WPS node 102 may engage specialized language models or apply unique natural language processing techniques optimized for that language.

Regarding the global reach of the disclosed system and method, a cultural intelligence layer may be added to the language indicator. The goal of this layer is for the system to not only recognize the language, but also adapt its recommendations and interactions to be culturally sensitive and appropriate for the couple 111. In one embodiment, the disclosed system may employ integrated translation capabilities. This may allow both the couple 111 and the wedding planning organizer of the nodes 113 associated with the WPS 102 to communicate effortlessly via the chatbot 114, no matter where they are in the world or what languages they use. The language indicator metadata may support and/or trigger this feature, making the system truly globally effective.

The WPS node 102 may query a local historical weddings'-related database 103 for the historical local weddings'-related data based on the wedding planning request data associated with the current user entity 101 node and the conversation data. The WPS node 102 may acquire relevant remote weddings'-related data from a remote database 106 residing on the cloud server 105. The weddings'-related data in the database 106 may be collected from other wedding planning outfits of the same type. The remote weddings'-related data may be collected from the user entities of the same (or similar) type, age, gender, language, location, etc. as the local user entity 101 based in part on data extracted from the requesting couple 111 profile data and the conversation data.

The WPS node 102 may generate a feature vector or classifier based on the user entity 101-related data, a request data and the collected heuristics data (i.e., pre-stored local historical data 103 and remote historical data 106). The WPS node 102 may ingest the feature vector/classifier data into an AI/ML module 107. The AI/ML module 107 may generate a predictive model(s) 108 based on the feature vector/classifier data to predict wedding planning parameters for automatically generating wedding planning recommendation and/or report that may be provided to the wedding organizer-entity nodes 113. The wedding planning parameters may be further analyzed by the WPS node 102 prior to generation of the actual wedding planning recommendation report. In one embodiment, the wedding planning report may be used for adjustment of the wedding budget and financing terms of the wedding.

Figure 1B:
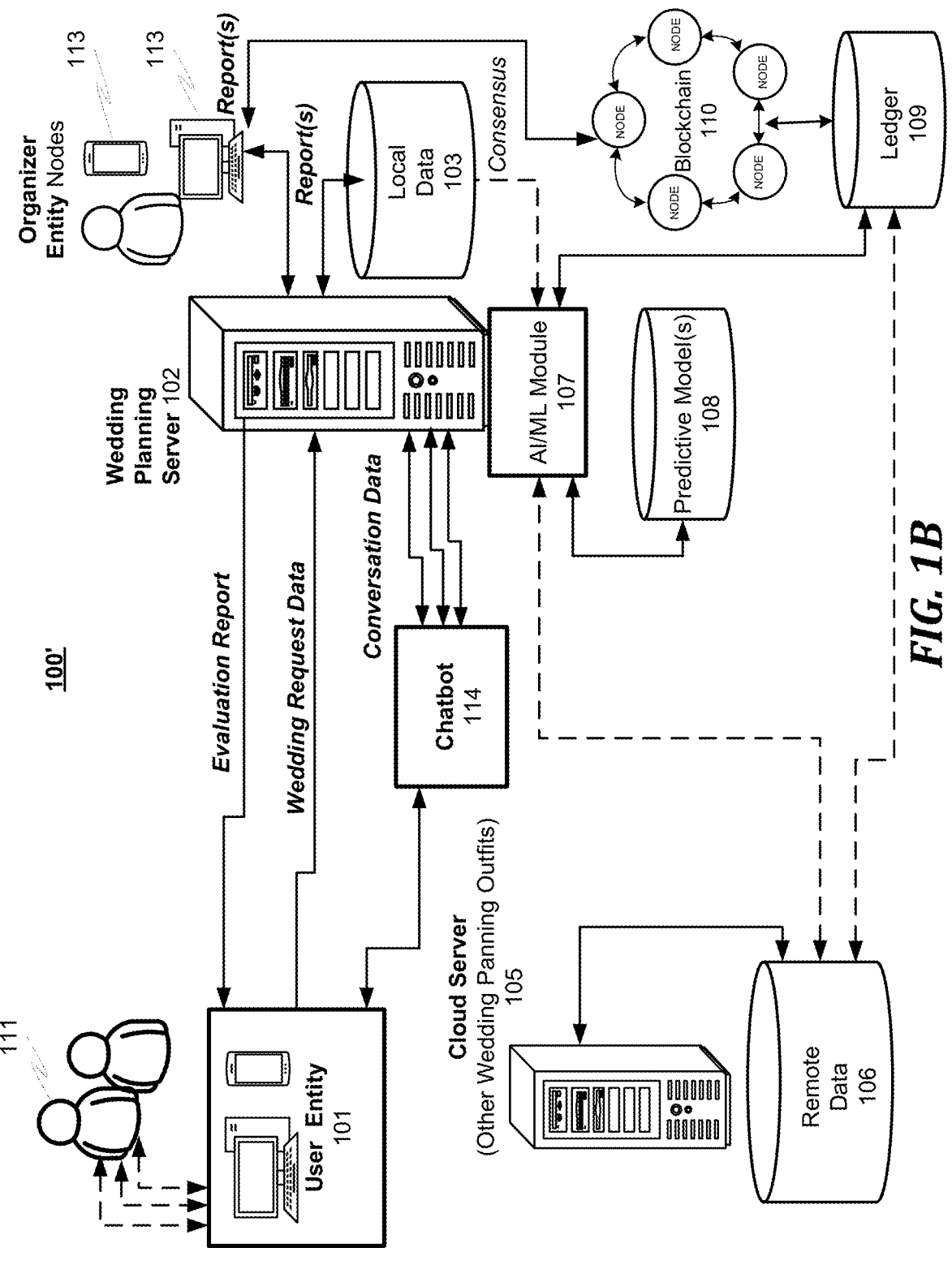
FIG. 1B illustrates a network diagram of a system for an AI-based automated real-time wedding platform based on predictive analytics of a couple-related data implemented over a blockchain network consistent with the present disclosure.

FIG. 1B illustrates a network diagram of a system for an AI-based automated real-time wedding platform based on predictive analytics of a couple-related data implemented over a blockchain network consistent with the present disclosure.

Referring to FIG. 1B, the example network 100' includes the Wedding Planning Server (WPS) node 102 connected to a cloud server node(s) 105 over a network. The WPS node 102 is configured to host an AI/ML module 107. The WPS node 102 may receive a wedding planning request from a couple 111 including requesting couple profile data from the user-entity node 101 associated with the couple 111. The WPS node 102 may receive transcribed call or audio data related to the conversation between the user entity 101 associated with the couple 111 and the responding wedding organizer agent that may be implemented as chatbot 114 supported by the AI/ML module 107 of the WPS node 102. The user request data may include documents (digital or OCRed), video and audio files.

The wedding planning request may have language indicator metadata representing the language of the requesting couple 111. The conversation data may refer to any communications via a chatbot 114 application. In one embodiment, the conversation data may be processed by the WPS node 102 using the pre-trained large language models. The WPS node 102 may derive the language indicator metadata and parse out the wedding planning request and/or the conversation data based on the language indicator metadata.

The WPS node 102 may query a local historical weddings'-related database 103 for the historical local weddings'-related data based on the wedding planning request data associated with the current user entity 101 node and the conversation data. The WPS node 102 may acquire relevant remote weddings'-related data from a remote database 106 residing on the cloud server 105. The weddings'-related data in the database 106 may be collected from other wedding planning outfits of the same type. The remote weddings'-related data may be collected from the user entities of the same (or similar) type, age, gender, language, location, etc. as the local user entity 101 based in part on data extracted from the requesting couple 111 profile data and the conversation data.

The WPS node 102 may generate a feature vector or classifier based on the user entity 101-related data, a request data and the collected heuristics data (i.e., pre-stored local historical data 103 and remote historical data 106). The WPS node 102 may ingest the feature vector/classifier data into an AI/ML module 107. The AI/ML module 107 may generate a predictive model(s) 108 based on the feature vector/classifier data to predict wedding planning parameters for automatically generating wedding planning recommendation and/or report that may be provided to the wedding organizer-entity nodes 113. The wedding planning parameters may be further analyzed by the WPS node 102 prior to generation of the actual wedding planning recommendation report.

In one embodiment, the WPS node 102 may receive the wedding planning parameters from a permissioned blockchain 110 ledger 109 based on a consensus from the wedding organizer-entity nodes 113 confirming the questions and comments to be presented by the chatbot 114 to the requesting couple 111 of the user entity 101. Additionally, confidential historical couples'-related information and previous couples'-related conversation-related parameters may also be acquired from the permissioned blockchain 110. The newly acquired wedding planning request data with corresponding conversation data parameters may be also recorded on the ledger 109 of the blockchain 110 so it can be used as training data for the predictive model(s) 108.

In this implementation the WPS node 102, the cloud server 105, the wedding organizer-entity nodes 113 and the user entities(s) 101 may serve as blockchain 110 peer nodes. In one embodiment, local data from the database 103 and remote data from the database 106 may be duplicated on the blockchain ledger 109 for higher security of storage.

The AI/ML module 107 may generate a predictive model(s) 108 to predict the wedding planning parameters in response to the specific relevant pre-stored weddings'-related data acquired from the blockchain 110 ledger 109. This way, the current wedding planning parameters may be predicted based not only on the current couple 111 associated with the entity 101-related data, but also based on the previously collected heuristics. This way, the most optimal way of handling the wedding planning request for the most likely successful planning and organizing of the wedding may be included into the wedding plan report. After the wedding planning request data processing and the wedding planning recommendation(s) and/or report generation is completed, the related documents may be converted into unique secure NFT assets to be recorded on the permissioned blockchain to be used for future predictive models' training.

In one embodiment, as a second round of approval, a blockchain consensus may be achieved among the wedding organizer-entities 113 in order to approve the wedding planning recommendation(s) generated by the WPS node 102.

Figure 2:
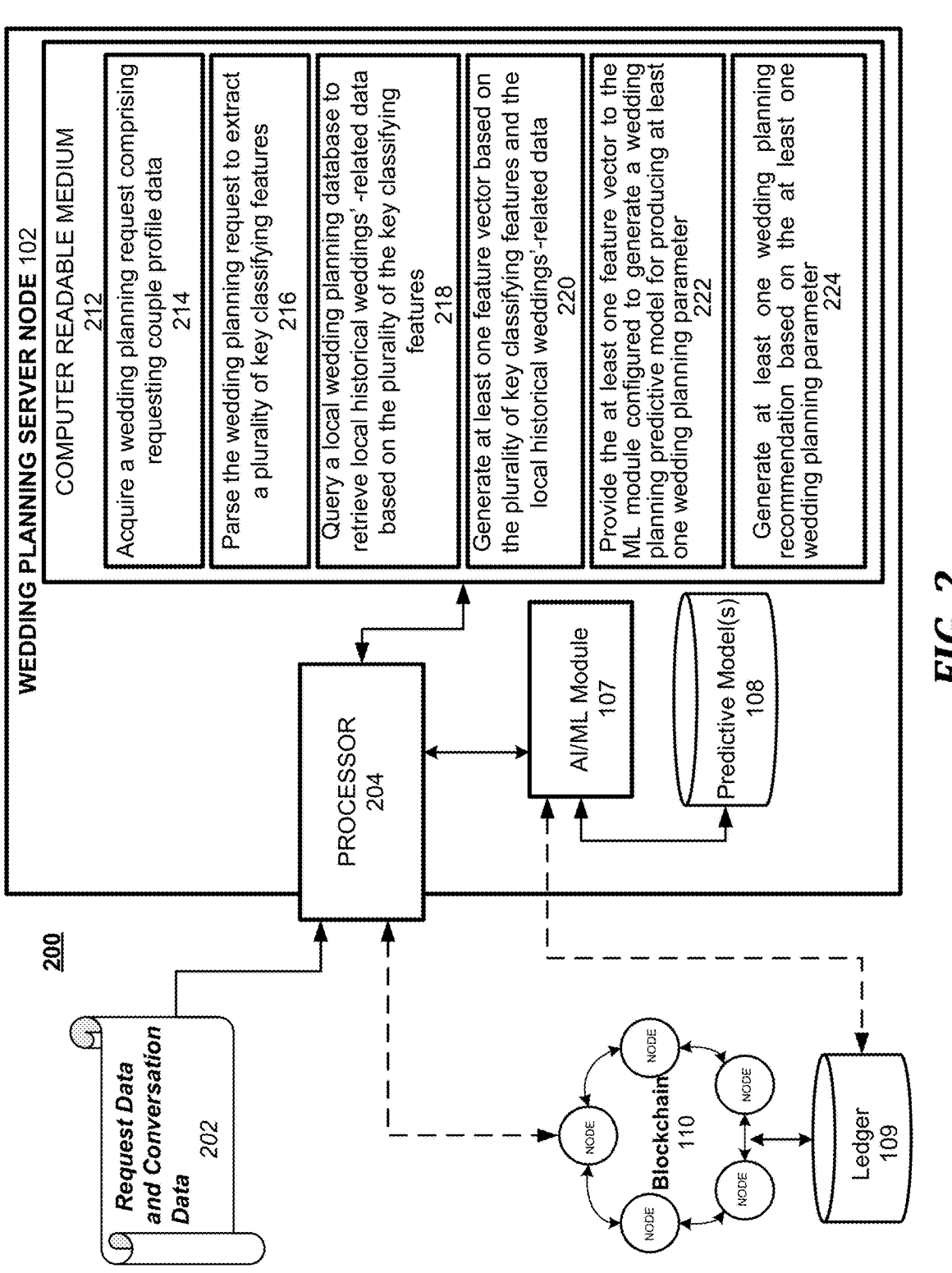
FIG. 2 illustrates a network diagram of a system including detailed features of a Wedding Planning Server (WPS) node consistent with the present disclosure.

FIG. 2 illustrates a network diagram of a system including detailed features of a Wedding Planning Server (WPS) node consistent with the present disclosure.

Referring to FIG. 2, the example network 200 includes the WPS node 102 connected to the user entity 101 and to the wedding organizer entity node(s) 113 (see FIGS. 1A-B). The WPS node 102 may be connected to the chatbot 114 to receive the conversation data as discussed above with reference to FIGS. 1A-B.

The WPS node 102 is configured to host an AI/ML module 107. As discussed above with respect to FIGS. 1A-B, the WPS node 102 may receive the wedding planning request data and conversation data 202 from the user node 101 and pre-stored weddings'-related data retrieved from the local and remote databases 103 and 106. As discussed above, the pre-stored weddings'-related data may be retrieved from the ledger 109 of the permissioned block-chain 110.

The AI/ML module 107 may generate a predictive model(s) 108 based on the data 202 provided by the WPS node 102. As discussed above, the AI/ML module 107 may provide predictive outputs data in the form of wedding planning parameters for automatic generation of the wedding planning recommendation or report (see FIG. 1B). The WPS node 102 may process the predictive outputs data received from the AI/ML module 107 to generate the conversation recommendations pertaining to the questions and concerns to be directed at the couple 111 of the user entity 101 via a chatbot 114 (See FIGS. 1A-B).

In one embodiment, the WPS node 102 may continually monitor the conversation data and may detect a parameter that deviates from a previous recorded parameter (or from a median reading value) by a margin that exceeds a threshold value pre-set for this particular parameter. For example, if couple's 111 answers change significantly, this may cause a change in wedding planning parameters used for generation for the wedding planning recommendation or report. Accordingly, once the threshold is met or exceeded by at least one parameter associated with the user entity, the WPS node 102 may provide the currently acquired conversation-related parameter to the AI/ML module 107 to generate updated wedding recommendation parameters for the summarizer module based on the current conversation data.

While this example describes in detail only one WPS node 102, multiple such nodes may be connected to the network and to the blockchain 110. It should be understood that the WPS node 102 may include additional components and that some of the components described herein may be removed and/or modified without departing from a scope of the WPS node 102 disclosed herein. The WPS node 102 may be a computing device or a server computer, or the like, and may include a processor 204, which may be a semiconductor-based microprocessor, a central processing unit (CPU), an application specific integrated circuit (ASIC), a field-pro-grammable gate array (FPGA), and/or another hardware device. Although a single processor 204 is depicted, it should be understood that the WPS node 102 may include multiple processors, multiple cores, or the like, without departing from the scope of the WPS node 102 system.

The WPS node 102 may also include a non-transitory computer readable medium 212 that may have stored thereon machine-readable instructions executable by the processor 204. Examples of the machine-readable instructions are shown as 214-224 and are further discussed below. Examples of the non-transitory computer readable medium 212 may include an electronic, magnetic, optical, or other physical storage device that contains or stores executable instructions. For example, the non-transitory computer readable medium 212 may be a Random-Access memory (RAM), an Electrically Erasable Programmable Read-Only Memory (EEPROM), a hard disk, an optical disc, or other type of storage device.

The processor 204 may fetch, decode, and execute the machine-readable instructions 214 to acquire a wedding planning request comprising requesting couple 111 profile data (see FIGS. 1A-B). The processor 204 may fetch, decode, and execute the machine-readable instructions 216 to parse the wedding planning request to extract a plurality of key classifying features. The processor 204 may fetch, decode, and execute the machine-readable instructions 218 to query a local wedding planning database to retrieve local historical weddings'-related data based on the plurality of the key classifying features. The processor 204 may fetch, decode, and execute the machine-readable instructions 220 to generate at least one feature vector based on the plurality of key classifying features and the local historical wed-dings'-related data.

The processor 204 may fetch, decode, and execute the machine-readable instructions 222 to provide the at least one feature vector to the ML module configured to generate a wedding planning predictive model for producing at least one wedding planning parameter. Note that the chatbot may represent a wedding organizer in communication with the user-entity node 101 over a secured communication channel generating conversation data. The processor 204 may fetch, decode, and execute the machine-readable instructions 224 to generate at least one wedding planning recommendation based on the at least one wedding planning parameter.

As a non-limiting example, a consensual approval of the wedding planning report may be associated with a request for additional data such as proof of corrected wedding-related quotes, vendors' data, etc. The permissioned block-chain 110 may be configured to use one or more smart contracts that manage transactions for multiple participating nodes and for recording the transactions on the ledger 109.

FIG. 3A illustrates a flowchart of a method for an AI-based automated real-time wedding planning based on predictive analytics of a couple-related data consistent with the present disclosure.

Referring to FIG. 3A, the method 300 may include one or more of the steps described below. FIG. 3A illustrates a flow chart of an example method executed by the WPS node 102 (see FIG. 2). It should be understood that method 300 depicted in FIG. 3A may include additional operations and that some of the operations described therein may be removed and/or modified without departing from the scope of the method 300. The description of the method 300 is also made with reference to the features depicted in FIG. 2 for purposes of illustration. Particularly, the processor 204 of the WPS node 102 may execute some or all of the operations included in the method 300.

With reference to FIG. 3A, at block 302, the processor 204 may acquire a wedding planning request comprising requesting couple profile data. At block 304, the processor 204 may parse the wedding planning request to extract a plurality of key classifying features. At block 306, the processor 204 may query a local wedding planning database to retrieve local historical weddings'-related data based on the plurality of the key classifying features. At block 308, the processor 204 may generate at least one feature vector based on the plurality of key classifying features and the local historical weddings'-related data. At block 310, the processor 204 may provide the at least one feature vector to the ML module configured to generate a wedding planning predictive model for producing at least one wedding planning parameter. At block 312, the processor 204 may generate at least one wedding planning recommendation based on the at least one wedding planning parameter.

FIG. 3B illustrates a further flowchart of a method for an AI-based automated real-time wedding planning based on predictive analytics of a couple-related data consistent with the present disclosure.

Referring to FIG. 3B, the method 300' may include one or more of the steps described below. FIG. 3B illustrates a flow chart of an example method executed by the WPS node 102 (see FIG. 2). It should be understood that method 300' depicted in FIG. 3B may include additional operations and that some of the operations described therein may be removed and/or modified without departing from the scope of the method 300'. The description of the method 300' is also made with reference to the features depicted in FIG. 2 for purposes of illustration. Particularly, the processor 204 of the WPS node 102 may execute some or all of the operations included in the method 300'.

With reference to FIG. 3B, at block 314, the processor 204 may monitor conversation data produced by communication of the requesting couple with a wedding planning chatbot associated with the wedding planning predictive model.

Note that the conversation data may be any of: audio data, video data, imaging data and textual data. At block 316, the processor 204 may derive a set of classifying features from the conversation data based on the plurality of the key classifying features. At block 318, the processor 204 may extract a language identifier from the conversation data. At block 320, the processor 204 may derive the set of classifying features based on the plurality of key classifying features based on the language identifier. At block 322, the processor 204 may retrieve remote historical weddings'-related data from at least one remote database based on based on the plurality of the key classifying features, wherein the remote historical weddings'-related data is collected at locations associated with remote wedding planning organizations.

At block 324, the processor 204 may generate the at least one feature vector based on the set of classifying features, the plurality of key classifying features and the local historical weddings'-related data combined with the remote historical weddings'-related data. At block 326, the processor 204 may continuously monitor incoming conversation data to determine if at least one value of conversation-related parameters deviates from a previous value of a previous conversation-related parameter by a margin exceeding a pre-set threshold value. At block 328, the processor 204 may responsive to the at least one value of the conversation-related parameters deviating from the previous value by the margin exceeding the pre-set threshold value, generate an updated feature vector based on the incoming conversation data and generate at least one wedding planning parameter produced by the wedding planning predictive model in response to the updated feature vector.

At block 330, the processor 204 may record the at least one wedding planning parameter on a permissioned blockchain ledger along with the plurality of key classifying features. At block 332, the processor 204 may retrieve the at least one wedding planning parameter from the blockchain responsive to a consensus among vendor entities onboarded onto the permissioned blockchain. At block 334, the processor 204 may execute a smart contract to generate at least one NFT corresponding to wedding plan-related documentation on the permissioned blockchain.

In one disclosed embodiment, the wedding planning parameters' model may be generated by the AI/ML module 107 that may use training data sets to improve accuracy of the prediction of the wedding planning parameters. The wedding planning parameters used in training data sets may be stored in a centralized local database (such as one used for storing local weddings' data 103 depicted in FIG. 1A). In one embodiment, a neural network may be used in the AI/ML module 107 for wedding planning parameters' modeling and wedding planning report generation.

In another embodiment, the AI/ML module 107 may use a decentralized storage such as a blockchain 110 (see FIG. 1B) that is a distributed storage system, which includes multiple nodes that communicate with each other. The decentralized storage includes an append-only immutable data structure resembling a distributed ledger capable of maintaining records between mutually untrusted parties. The untrusted parties are referred to herein as peers or peer nodes. Each peer maintains a copy of the parameter(s) records and no single peer can modify the records without a consensus being reached among the distributed peers. For example, the peers 101, 113, 105 and 102 (FIG. 1B) may execute a consensus protocol to validate blockchain 110 storage transactions, group the storage transactions into blocks, and build a hash chain over the blocks. This process forms the ledger 109 by ordering the storage transactions, as is necessary, for consistency. In various embodiments, a permissioned and/or a permissionless blockchain can be used. In a public or permissionless blockchain, anyone can participate without a specific identity. Public blockchains can involve assets and use consensus based on various protocols such as Proof of Work (PoW). On the other hand, a permissioned blockchain provides secure interactions among a group of entities which share a common goal such as storing wedding planning parameters, but which do not fully trust one another.

This application utilizes a permissioned (private) block-chain that operates arbitrary, programmable logic, tailored to a decentralized storage scheme and referred to as "smart contracts" or "chaincodes." In some cases, specialized chaincodes may exist for management functions and param-eters which are referred to as system chaincodes. The application can further utilize smart contracts that are trusted distributed applications which leverage tamper-proof records of the blockchain database and an underlying agree-ment between nodes, which is referred to as an endorsement or endorsement policy. Blockchain transactions associated with this application can be "endorsed" before being com-mitted to the blockchain while transactions, which are not endorsed, are disregarded. An endorsement policy allows chaincodes to specify endorsers for a transaction in the form of a set of peer nodes that are necessary for endorsement. When a client sends the transaction to the peers specified in the endorsement policy, the transaction is executed to vali-date the transaction. After a validation, the transactions enter an ordering phase in which a consensus protocol is used to produce an ordered sequence of endorsed transactions grouped into blocks.

In the example depicted in FIG. 4, a host platform 420 (such as the WPS node 102) builds and deploys a machine learning model for predictive monitoring of assets 430. Here, the host platform 420 may be a cloud platform, an industrial server, a web server, a personal computer, a user device, and the like. Assets 430 can represent the wedding planning parameters. The blockchain 110 can be used to significantly improve both a training process 402 of the machine learning model and the wedding planning param-eters' predictive process 405 based on a trained machine learning model. For example, in 402, rather than requiring a data scientist/engineer or other user to collect the data, historical data (heuristics—i.e., weddings'-related data) may be stored by the assets 430 themselves (or through an intermediary, not shown) on the blockchain 110.

This can significantly reduce the collection time needed by the host platform 420 when performing predictive model training. For example, using smart contracts, data can be directly and reliably transferred straight from its place of origin (e.g., from the WPS node 102 or from databases 103 and 106 depicted in FIGS. 1A-1B) to the blockchain 110. By using the blockchain 110 to ensure the security and owner-ship of the collected data, smart contracts may directly send the data from the assets to the entities that use the data for building a machine learning model. This allows for sharing of data among the assets 430. The collected data may be stored in the blockchain 110 based on a consensus mecha-nism. The consensus mechanism pulls in (permissioned nodes) to ensure that the data being recorded is verified and accurate. The data recorded is time-stamped, cryptographi-cally signed, and immutable. It is therefore auditable, trans-parent, and secure.

Furthermore, training of the machine learning model on the collected data may take rounds of refinement and testing by the host platform 420. Each round may be based on additional data or data that was not previously considered to help expand the knowledge of the machine learning model. In 402, the different training and testing steps (and the data associated therewith) may be stored on the blockchain 110 by the host platform 420. Each refinement of the machine learning model (e.g., changes in variables, weights, etc.) may be stored on the blockchain 110. This, advantageously, provides verifiable proof of how the model was trained and what data was used to train the model. Furthermore, when the host platform 420 has achieved a finally trained model, the resulting model itself may be stored on the blockchain 110.

After the model has been trained, it may be deployed to a live environment where it can make recommendation-related predictions/decisions based on the execution of the final trained machine learning model using the predictive parameters. In this example, data fed back from the asset 430 may be input into the machine learning model and may be used to make event predictions such as wedding planning parameters based on the recorded weddings'-related data. Determinations made by the execution of the machine learning model (e.g., approval of wedding planning reports, etc.) at the host platform 420 may be stored on the block-chain 110 to provide auditable/verifiable proof. As one non-limiting example, the machine learning model may predict a future change of a part of the asset 430 (the wedding planning parameters). The data behind this deci-sion may be stored by the host platform 420 on the block-chain 110.

As discussed above, in one embodiment, the features and/or the actions described and/or depicted herein can occur on or with respect to the blockchain 110. The above embodiments of the present disclosure may be implemented in hardware, in computer-readable instructions executed by a processor, in firmware, or in a combination of the above. The computer computer-readable instructions may be embodied on a computer-readable medium, such as a storage medium. For example, the computer computer-readable instructions may reside in random access memory ("RAM"), flash memory, read-only memory ("ROM"), erasable pro-grammable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative embodiment, the processor and the storage medium may reside as discrete components. For example, FIG. 5 illustrates an example computing device (e.g., a server node) 500, which may represent or be integrated in any of the above-described components, etc.

Figure 5:
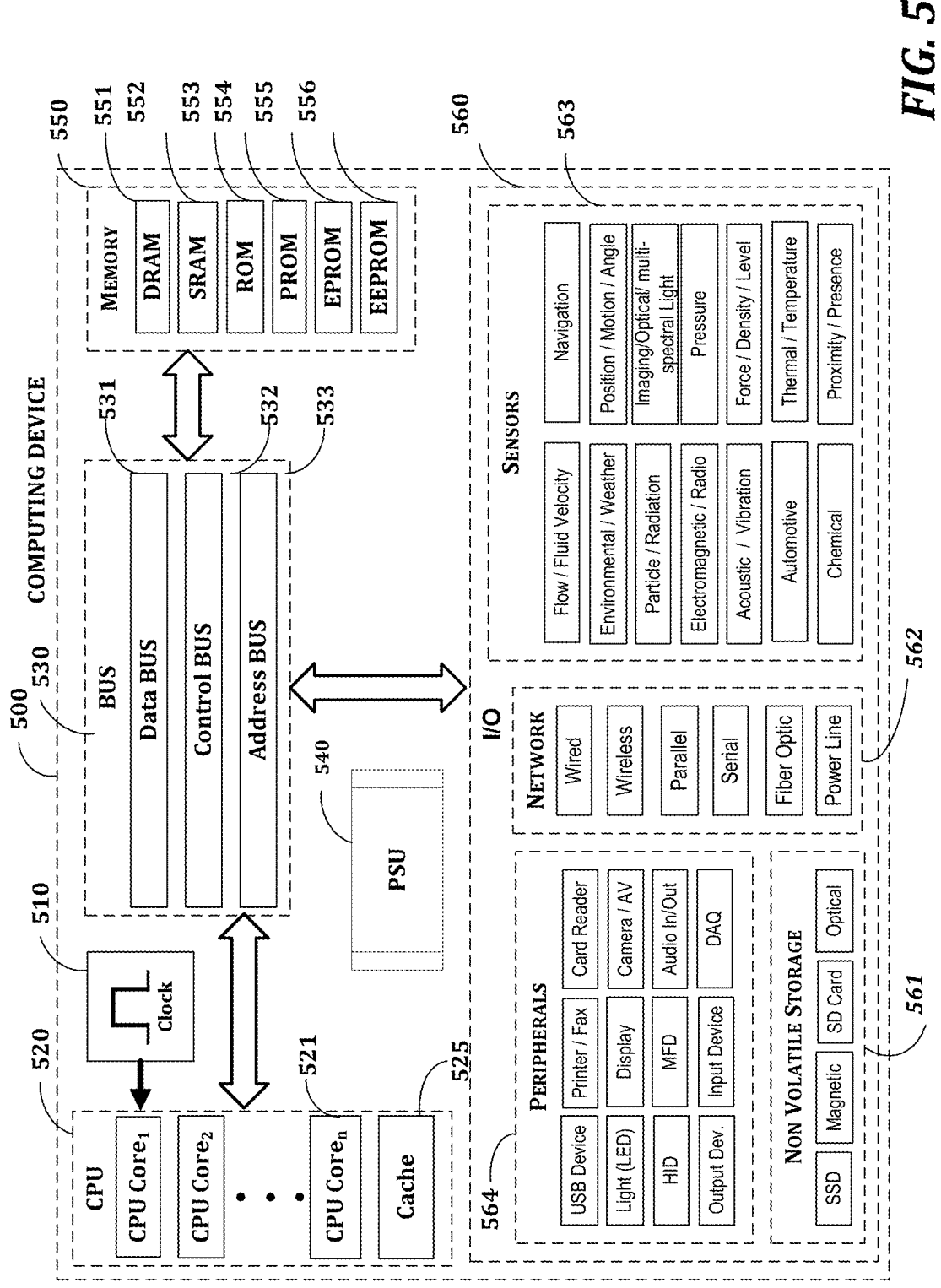
FIG. 5 illustrates a block diagram of a system including a computing device for performing the method of FIGS. 3A and 3B.

FIG. 5 illustrates a block diagram of a system including computing device 500. The computing device 500 may comprise, but not be limited to the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a main-frame, or a quantum computer;

A minicomputer, wherein the minicomputer computing device comprises, but is not limited to, an IBM AS500/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device;

The WPS node 102 (see FIG. 2) may be hosted on a centralized server or on a cloud computing service. Although method 300 has been described to be performed by the WPS node 102 implemented on a computing device 500, it should be understood that, in some embodiments, different operations may be performed by a plurality of the computing devices 500 in operative communication at least one network.

Embodiments of the present disclosure may comprise a computing device having a central processing unit (CPU) 520, a bus 530, a memory unit 550, a power supply unit (PSU) 550, and one or more Input/Output (I/O) units. The CPU 520 coupled to the memory unit 550 and the plurality of I/O units 560 via the bus 530, all of which are powered by the PSU 550. It should be understood that, in some embodiments, each disclosed unit may actually be a plurality of such units for the purposes of redundancy, high availability, and/or performance. The combination of the presently disclosed units is configured to perform the stages of any method disclosed herein.

Consistent with an embodiment of the disclosure, the aforementioned CPU 520, the bus 530, the memory unit 550, a PSU 550, and the plurality of I/O units 560 may be implemented in a computing device, such as computing device 500. Any suitable combination of hardware, software, or firmware may be used to implement the aforementioned units. For example, the CPU 520, the bus 530, and the memory unit 550 may be implemented with computing device 500 or any of other computing devices 500, in combination with computing device 500. The aforementioned system, device, and components are examples and other systems, devices, and components may comprise the aforementioned CPU 520, the bus 530, the memory unit 550, consistent with embodiments of the disclosure.

At least one computing device 500 may be embodied as any of the computing elements illustrated in all of the attached figures, including the WPS node 102 (FIG. 2). A computing device 500 does not need to be electronic, nor even have a CPU 520, nor bus 530, nor memory unit 550. The definition of the computing device 500 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 500, especially if the processing is purposeful.

With reference to FIG. 5, a system consistent with an embodiment of the disclosure may include a computing device, such as computing device 500. In a basic configuration, computing device 500 may include at least one clock module 510, at least one CPU 520, at least one bus 530, and at least one memory unit 550, at least one PSU 550, and at least one I/O 560 module, wherein I/O module may be comprised of, but not limited to a non-volatile storage sub-module 561, a communication sub-module 562, a sensors sub-module 563, and a peripherals sub-module 565.

A system consistent with an embodiment of the disclosure the computing device 500 may include the clock module 510 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 520, the central component of modern computers, which relies on a clock. The only exceptions are asynchronous circuits such as asynchronous CPUs. The clock 510 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 5 wires.

Many computing devices 500 use a "clock multiplier" which multiplies a lower frequency external clock to the appropriate clock rate of the CPU 520. This allows the CPU 520 to operate at a much higher frequency than the rest of the computer, which affords performance gains in situations where the CPU 520 does not need to wait on an external factor (like memory 550 or input/output 560). Some embodiments of the clock 510 may include dynamic frequency change, where the time between clock edges can vary widely from one edge to the next and back again.

A system consistent with an embodiment of the disclosure the computing device 500 may include the CPU unit 520 comprising at least one CPU Core 521. A plurality of CPU cores 521 may comprise identical CPU cores 521, such as, but not limited to, homogeneous multi-core systems. It is also possible for the plurality of CPU cores 521 to comprise different CPU cores 521, such as, but not limited to, heterogeneous multi-core systems, big.LITTLE systems and some AMD accelerated processing units (APU). The CPU unit 520 reads and executes program instructions which may be used across many application domains, for example, but not limited to, general purpose computing, embedded computing, network computing, digital signal processing (DSP), and graphics processing (GPU). The CPU unit 520 may run multiple instructions on separate CPU cores 521 at the same time. The CPU unit 520 may be integrated into at least one of a single integrated circuit die and multiple dies in a single chip package. The single integrated circuit die and multiple dies in a single chip package may contain a plurality of other aspects of the computing device 500, for example, but not limited to, the clock 510, the CPU 520, the bus 530, the memory 550, and I/O 560.

The CPU unit 520 may contain cache 522 such as, but not limited to, a level 1 cache, level 2 cache, level 3 cache or combination thereof. The aforementioned cache 522 may or may not be shared amongst a plurality of CPU cores 521. The cache 522 sharing comprises at least one of message passing and inter-core communication methods may be used for the at least one CPU Core 521 to communicate with the cache 522. The inter-core communication methods may comprise, but not limited to, bus, ring, two-dimensional mesh, and crossbar. The aforementioned CPU unit 520 may employ symmetric multiprocessing (SMP) design.

The plurality of the aforementioned CPU cores 521 may comprise soft microprocessor cores on a single field programmable gate array (FPGA), such as semiconductor intellectual property cores (IP Core). The plurality of CPU cores 521 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 521, for example, but not limited to Instruction-level parallelism (ILP) such as, but not limited to, super-scalar pipelining, and Thread-level parallelism (TLP).

Consistent with the embodiments of the present disclosure, the aforementioned computing device 500 may employ a communication system that transfers data between components inside the aforementioned computing device 500, and/or the plurality of computing devices 500. The aforementioned communication system will be known to a person having ordinary skill in the art as a bus 530. The bus 530 may embody internal and/or external plurality of hardware and software components, for example, but not limited to a wire, optical fiber, communication protocols, and any physical arrangement that provides the same logical function as a parallel electrical bus. The bus 530 may comprise at least one of, but not limited to a parallel bus, wherein the parallel bus carry data words in parallel on multiple wires, and a serial bus, wherein the serial bus carry data in bit-serial form. The bus 530 may embody a plurality of topologies, for example, but not limited to, a multidrop/electrical parallel topology, a daisy chain topology, and a connected by switched hubs, such as USB bus. The bus 530 may comprise a plurality of embodiments, for example, but not limited to:

Internal data bus (data bus) 531/Memory bus

Control bus 532

Address bus 533

System Management Bus (SMBus)

Front-Side-Bus (FSB)

External Bus Interface (EBI)

Local bus

Expansion bus

Lightning bus

Controller Area Network (CAN bus)

Camera Link

ExpressCard

Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.

Small Computer System Interface (SCSI)/Serial Attached SCSI (SAS)

HyperTransport

InfiniBand

RapidIO

Mobile Industry Processor Interface (MIPI)

Coherent Processor Interface (CAPI)

Plug-n-play

1-Wire

Peripheral Component Interconnect (PCI), including embodiments such as, but not limited to, Accelerated Graphics Port (AGP), Peripheral Component Interconnect extended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper {Cu} Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).

Industry Standard Architecture (ISA), including embodiments such as, but not limited to Extended ISA (EISA), PC/XT-bus/PC/AT-bus/PC/105 bus (e.g., PC/105-Plus, PCI/105-Express, PCI/105, and PCI-105), and Low Pin Count (LPC).

Music Instrument Digital Interface (MIDI)

Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1395 Interface/Firewire, Thunderbolt, and extensible Host Controller Interface (xHCI).

Consistent with the embodiments of the present disclosure, the aforementioned computing device 500 may employ hardware integrated circuits that store information for immediate use in the computing device 500, known to the person having ordinary skill in the art as primary storage or memory 550. The memory 550 operates at high speed, distinguishing it from the non-volatile storage sub-module 561, which may be referred to as secondary or tertiary storage, which provides slow-to-access information but offers higher capacities at lower cost. The contents contained in memory 550, may be transferred to secondary storage via techniques such as, but not limited to, virtual memory and swap. The memory 550 may be associated with addressable semiconductor memory, such as integrated circuits consisting of silicon-based transistors, used for example as primary storage but also other purposes in the computing device 500. The memory 550 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 551, Static Random-Access Memory (SRAM) 552, CPU Cache memory 525, Advanced Random-Access Memory (A-RAM), and other tyWPS of primary storage such as Random-Access Memory (RAM).

Non-volatile memory which can retain stored information even after power is removed, for example, but not limited to, Read-Only Memory (ROM) 553, Programmable ROM (PROM) 555, Erasable PROM (EPROM) 555, Electrically Erasable PROM (EEPROM) 556 (e.g., flash memory and Electrically Alterable PROM [EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 500 may employ the communication system between an information processing system, such as the computing device 500, and the outside world, for example, but not limited to, human, environment, and another computing device 500. The aforementioned communication system will be known to a person having ordinary skill in the art as I/O 560. The I/O module 560 regulates a plurality of inputs and outputs with regard to the computing device 500, wherein the inputs are a plurality of signals and data received by the computing device 500, and the outputs are the plurality of signals and data sent from the computing device 500. The I/O module 560 interfaces a plurality of hardware, such as, but not limited to, non-volatile storage 561, communication devices 562, sensors 563, and peripherals 565. The plurality of hardware is used by at least one of, but not limited to, human, environment, and another computing device 500 to communicate with the present computing device 500. The I/O module 560 may comprise a plurality of forms, for example, but not limited to channel I/O, port mapped I/O, asynchronous I/O, and Direct Memory Access (DMA).

Consistent with the embodiments of the present disclosure, the aforementioned computing device 500 may employ the non-volatile storage sub-module 561, which may be referred to by a person having ordinary skill in the art as one of secondary storage, external memory, tertiary storage, off-line storage, and auxiliary storage. The non-volatile storage sub-module 561 may not be accessed directly by the CPU 520 without using an intermediate area in the memory 550. The non-volatile storage sub-module 561 does not lose data when power is removed and may be two orders of magnitude less costly than storage used in memory modules, at the expense of speed and latency. The non-volatile storage sub-module 561 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (561) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD+RW/DVD+R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, Compact-Flash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 500 may employ the communication sub-module 562 as a subset of the I/O

560, which may be referred to by a person having ordinary skill in the art as at least one of, but not limited to, computer network, data network, and network. The network allows computing devices 500 to exchange data using connections, which may be known to a person having ordinary skill in the art as data links, between network nodes. The nodes comprise network computer devices 500 that originate, route, and terminate data. The nodes are identified by network addresses and can include a plurality of hosts consistent with the embodiments of a computing device 500. The aforementioned embodiments include, but not limited to personal computers, phones, servers, drones, and networking devices such as, but not limited to, hubs, switches, routers, modems, and firewalls.

Two nodes can be networked together, when one computing device 500 is able to exchange information with the other computing device 500, whether or not they have a direct connection with each other. The communication sub-module 562 supports a plurality of applications and services, such as, but not limited to World Wide Web (WWW), digital video and audio, shared use of application and storage computing devices 500, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 5 [IPv5], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 562 may comprise a plurality of size, topology, traffic control mechanism and organizational intent. The communication sub-module 562 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Cellular systems embody technologies such as, but not limited to, 3G, 5G (such as WiMax and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line and wireless communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 500 may employ the sensors sub-module 563 as a subset of the I/O 560. The sensors sub-module 563 comprises at least one of the devices, modules, and subsystems whose purpose is to detect events or changes in its environment and send the information to the computing device 500. Sensors are sensitive to the measured property, are not sensitive to any property not measured, but may be encountered in its application, and do not significantly influence the measured property. The sensors sub-module 563 may comprise a plurality of digital devices and analog devices, wherein if an analog device is used, an Analog to Digital (A-to-D) converter must be employed to interface the said device with the computing device 500. The sensors may be subject to a plurality of deviations that limit sensor accuracy. The sensors sub-module 563 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nano-sensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (O2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermos-luminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, LIDAR, multi-spectral light sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photo-switch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezo capacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 500 may employ the peripherals sub-module 562 as a subset of the I/O 560. The peripheral sub-module 565 comprises ancillary devices used to put information into and get information out of the computing device 500. There are 3 categories of devices comprising the peripheral sub-module 565, which exist based on their relationship with the computing device 500, input devices, output devices, and input/output devices. Input devices send at least one of data and instructions to the computing device 500. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 500. Output devices convert electronically generated information into a form that can be presented to humans. Input/output devices that perform both input and output functions. It should be understood by a person having ordinary skill in the art that the ensuing are non-limiting embodiments of the aforementioned peripheral sub-module 565:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 500. The information can be stored in a multitude of formats depending on the user's requirement. Examples of tyWPS of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 500 for at least one of processing, recording, and carrying out commands. Devices such as microphones allow users to speak to the computer in order to record a voice message or navigate software. Aside from recording, audio input devices are also used with speech recognition software. Examples of tyWPS of audio input devices include, but not limited to, microphone, Musical Instrument Digital Interface (MIDI) devices such as, but not limited to a keyboard, and headset.

Data Acquisition (DAQ) devices convert at least one of analog signals and physical parameters to digital values for processing by the computing device 500. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 562 sub-module), data storage device (non-volatile storage 561), facsimile (FAX), and graphics/sound cards.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A system for an automated wedding planning processing, comprising:

a processor of a wedding planning server node configured to host a machine learning (ML) module and connected to at least one user-entity node and to at least one wedding organizer-entity node over a network; and a memory on which are stored machine-readable instructions that when executed by the processor, cause the processor to:

acquire a wedding planning request comprising requesting couple profile data;

parse the wedding planning request to extract a plurality of key classifying features;

derive language indicator metadata from the wedding planning request, the language indicator metadata representing a language of the requesting couple;

query a local wedding planning database to retrieve local historical weddings'-related data based on the plurality of the key classifying features;

generate at least one feature vector based on the plurality of key classifying features and the local historical weddings'-related data;

provide the at least one feature vector to the ML module configured to generate a wedding planning predictive model for producing at least one wedding planning parameter, wherein the ML module employs a fine-tuned model derived from a pre-trained language model to process the wedding planning request irrespective of data format;

dynamically tailor conversation recommendation parameters based on the language indicator metadata by engaging specialized language models optimized for a language indicated by the language indicator metadata;

generate at least one wedding planning recommendation based on the at least one wedding planning parameter; and record the at least one wedding planning parameter and the plurality of key classifying features on a permissioned blockchain ledger to ensure immutable validation across wedding organizer-entity nodes.

2. The system of the claim 1, wherein the machine-readable instructions that when executed by the processor, cause the processor to monitor conversation data produced by communication of the requesting couple with a wedding planning chatbot associated with the wedding planning predictive model.

3. The system of the claim 2, wherein the machine-readable instructions that when executed by the processor, cause the processor to derive a set of classifying features from the conversation data based on the plurality of the key classifying features.

4. The system of claim 3, wherein the conversation data comprising any of:

audio data;

video data;

imaging data; and textual data.

5. The system of claim 2, wherein the machine-readable instructions that when executed by the processor, cause the processor to extract a language identifier from the conversation data.

6. The system of claim 5, wherein the machine-readable instructions that when executed by the processor, cause the processor to derive the set of classifying features based on the plurality of key classifying features based on the language identifier.

7. The system of claim 1, wherein the machine-readable instructions that when executed by the processor, cause the processor to retrieve remote historical weddings' related data from at least one remote database based on based on the plurality of the key classifying features, wherein the remote historical weddings'-related data is collected at locations associated with remote wedding planning organizations.

8. The system of claim 7, wherein the machine-readable instructions that when executed by the processor, cause the processor to generate the at least one feature vector based on the set of classifying features, the plurality of key classifying features and the local historical weddings'-related data combined with the remote historical weddings' related data.

9. The system of claim 2, wherein the machine-readable instructions that when executed by the processor, cause the processor to continuously monitor incoming conversation data to determine if at least one value of conversation-related parameters deviates from a previous value of a previous conversation-related parameter by a margin exceeding a pre-set threshold value.

10. The system of claim 9, wherein the machine-readable instructions that when executed by the processor, cause the processor to, responsive to the at least one value of the conversation-related parameters deviating from the previous value by the margin exceeding the pre-set threshold value, generate an updated feature vector based on the incoming conversation data and generate at least one wedding planning parameter produced by the wedding planning predictive model in response to the updated feature vector.

11. The system of claim 1, wherein the machine-readable instructions that when executed by the processor, further cause the processor to record the at least one wedding planning parameter on a permissioned blockchain ledger along with the plurality of key classifying features.

12. The system of claim 11, wherein the machine-readable instructions that when executed by the processor, further cause the processor to retrieve the at least one wedding planning parameter from the blockchain responsive to a consensus among vendor entities onboarded onto the permissioned blockchain.

13. The system of claim 11, wherein the machine-readable instructions that when executed by the processor, further cause the processor to execute a smart contract to generate at least one NFT corresponding to wedding plan-related documentation on the permissioned blockchain.

14. A method for an automated wedding planning processing, comprising:

acquiring, by a wedding planning server (WPS) node, a wedding planning request comprising requesting couple profile data;

parsing, by the WPS node, the wedding planning request to extract a plurality of key classifying features;

deriving, by the WPS node, language indicator metadata from the wedding planning request, the language indicator metadata representing a language of the requesting couple;

querying, by the WPS node, a local wedding planning database to retrieve local historical weddings'-related data based on the plurality of the key classifying features;

generating, by the WPS node, at least one feature vector based on the plurality of key classifying features and the local historical weddings'-related data;

providing, by the WPS node, the at least one feature vector to the ML module configured to generate a wedding planning predictive model for producing at least one wedding planning parameter, wherein the ML module employs a fine-tuned model derived from a pre-trained language model to process the wedding planning request irrespective of data format;

dynamically tailoring, by the WPS node, conversation recommendation parameters based on the language indicator metadata by engaging specialized language models optimized for a language indicated by the language indicator metadata;

generating, by the WPS node, at least one wedding planning recommendation based on the at least one wedding planning parameter; and recording, by the WPS node, the at least one wedding planning parameter together with the plurality of key classifying features on a permissioned blockchain ledger validated by consensus among onboarded vendor nodes to ensure immutable verification of the recommendation.

15. The method of claim 14, further comprising monitoring conversation data produced by communication of the requesting couple with a wedding planning chatbot associated with the wedding planning predictive model.

16. The method of claim 15, further comprising deriving a set of classifying features from the conversation data based on the plurality of the key classifying features.

17. The method of claim 15, further comprising extracting a language identifier from the conversation data.

18. The method of claim 15, further comprising continuously monitoring incoming conversation data to determine if at least one value of conversation-related parameters deviates from a previous value of a previous conversation-related parameter by a margin exceeding a pre-set threshold value.

19. The method of claim 18, further comprising, responsive to the at least one value of the conversation-related parameters deviating from the previous value by the margin exceeding the pre-set threshold value, generating an updated feature vector based on the incoming conversation data and generating at least one wedding planning parameter produced by the wedding planning predictive model in response to the updated feature vector.

20. A non-transitory computer-readable medium comprising instructions, that when read by a processor, cause the processor to perform:

acquiring a wedding planning request comprising requesting couple profile data;

parsing the wedding planning request to extract a plurality of key classifying features;

deriving language indicator metadata from the wedding planning request, the language indicator metadata representing a language of the requesting couple;

querying a local wedding planning database to retrieve local historical weddings'-related data based on the plurality of the key classifying features;

generating at least one feature vector based on the plurality of key classifying features and the local historical weddings'-related data;

providing the at least one feature vector to the ML module configured to generate a wedding planning predictive model for producing at least one wedding planning parameter, wherein the ML module employs a fine-tuned model derived from a pre-trained language model to process the wedding planning request irrespective of data format;

dynamically tailoring conversation recommendation parameters based on the language indicator metadata by engaging specialized language models optimized for a language indicated by the language indicator metadata;

generating at least one wedding planning recommendation based on the at least one wedding planning parameter;

storing the at least one wedding planning parameter and the plurality of key classifying features on a permissioned blockchain ledger; and executing a smart contract to generate a blockchain-anchored token or NFT corresponding to the recommendation for authenticated vendor acceptance, wherein the smart contract manages transactions for multiple participating nodes and records the transactions on a ledger of the permissioned blockchain, and wherein related wedding planning documents are converted into unique secure NFT assets recorded on the permissioned blockchain for future predictive models' training.

* * * * *